E. H. WIGHT.
GAS MIXING BURNER.
APPLICATION FILED JAN. 23, 1912.
1,050,756. Patented Jan. 14, 1913.
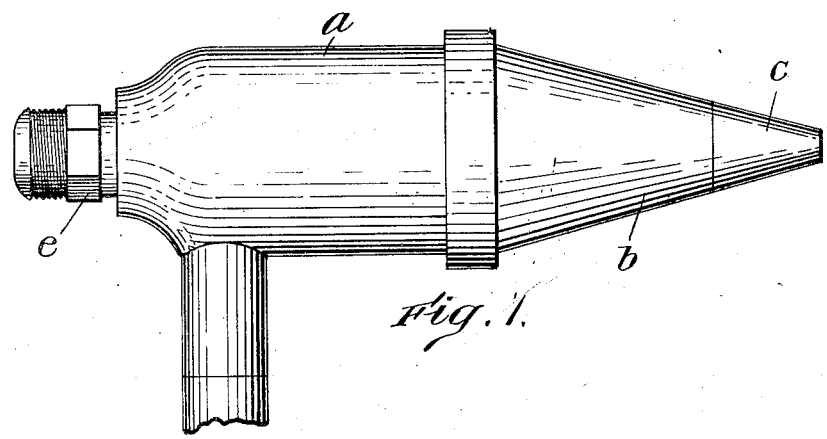
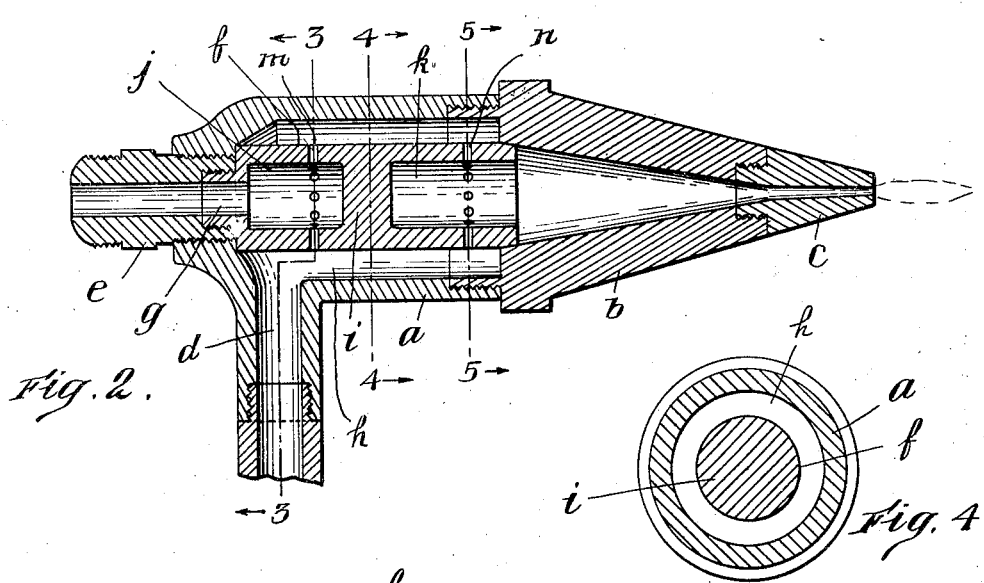
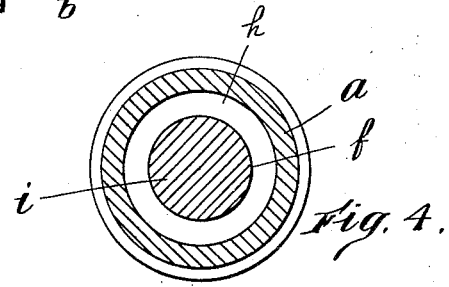
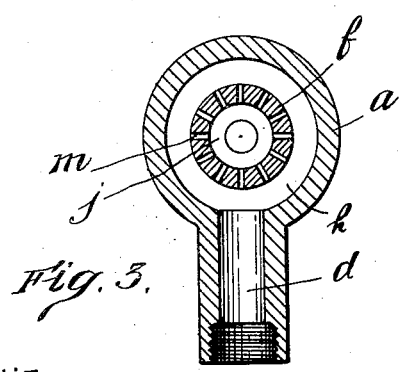
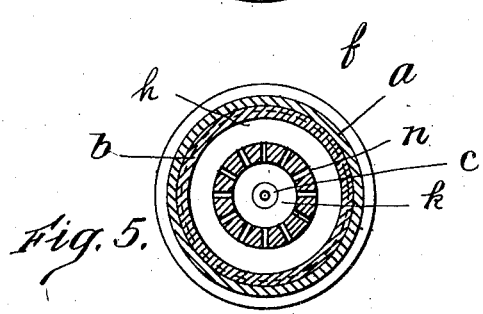
Witnesses:
H. B. Davis
Cynthia Doyle
Inventor:
Edward H. Wight
by Royce Hamman
Atty's

UNITED STATES PATENT OFFICE.

EDWARD H. WIGHT, OF QUINCY, MASSACHUSETTS.

GAS-MIXING BURNER.

1,050,756.

Specification of Letters Patent. Patented Jan. 14, 1913.

Application filed January 23, 1912. Serial No. 672,852.

*To all whom it may concern:*

Be it known that I, EDWARD H. WIGHT, a citizen of the United States, residing at Quincy, in the county of Norfolk, State of Massachusetts, have invented an Improvement in Gas-Mixing Burners, of which the following is a specification.

This invention relates to certain improvements in devices for mixing burning gases, and while it is especially intended for use in mixing and burning oxygen and acetylene gases, it may be used in other relations. The mixture, when burned, produces an intense heat, and the economy with which the burner is operated depends, to a large degree, on the thoroughness with which the gases are mixed before they are burned.

The intense heat which is produced also tends to cause the nozzle or burner, to be heated to a high degree, so that the nozzle has to be frequently cooled and is often damaged by the high heat.

The object of my invention is to produce a device of the character above referred to which will cause the gases to be thoroughly mixed before they are delivered to the tip of the nozzle where they are consumed, and further, to provide a form of nozzle in which the gases themselves will act to cool the nozzle, as they pass therethrough, to a sufficient extent to prevent the same from becoming so highly heated as to be detrimental thereto, or so that it will be necessary to cool the same while it is being used.

I accomplish these objects by the means shown in the accompanying drawing, in which, Figure 1 is a side elevation of a nozzle or burner made according to my invention. Fig. 2 is a longitudinally sectional view thereof. Figs. 3, 4 and 5 are respectively cross-sections at the lines 3—3, 4—4 and 5—5 of Fig. 2.

In the drawing $a$ indicates a hollow outer casing, which is of elongated cylindrical form and has a conical-shaped hollow extension $b$, threaded on one end thereof, a burner tip $c$ being threaded on the small end of said extension and connected thereto. The casing $a$ has an inlet passage $d$, for the acetylene gas, leading through its side wall at its opposite end from extension $b$, and a nipple $e$ is threaded into an aperture in the adjacent end of said casing $a$. A tubular inner casing $f$, of cylindrical form, is centrally arranged within the casing $a$ and is provided with a tubular boss $g$ on one end which is threaded into the bore of nipple $e$, the opposite end of the casing $f$ being held against the inner surface of the extension $b$ at its larger end, to make a tight connection therewith. An annular receiving chamber $h$ is thus provided between the inner walls of the outer casing $a$ and the outer walls of the inner casing $f$, which extends throughout substantially the entire length thereof. Said casing $f$ is provided with an imperforate partition $i$ in its middle portion which divides the same into an inlet chamber $j$, into which the passages through the boss $g$ leads, and into a discharge chamber $k$, which opens directly into the interior of the extension $b$, at its larger end. The walls of the chamber $j$ are provided with a series of radially disposed apertures $m$, which are arranged in a plane perpendicular to casing $f$ adjacent the partition $i$ and at one side of the inlet passage $d$. The walls of the chamber $k$ are also provided with a series of radially disposed passages $n$, similarly arranged in a plane perpendicular to casing $f$, each passage being arranged in an alinement with a corresponding, oppositely disposed passage.

The operation is as follows:—The oxygen gas is forced through the nipple $e$ into the chamber $j$ and is discharged through the apertures $m$ in radial directions into the annular receiving chamber $h$. At the same time the acetylene gas is forced through the pipe $d$ into said chamber $h$, so that the jets of oxygen gas are discharged into a chamber containing acetylene gas and the two gases become partially mixed. The partial mixture thus secured is conducted along the annular chamber $h$ until it reaches the apertures $n$, where it is forcibly discharged through said apertures into the chamber $k$. As the jets of partly mixed gas will be directed toward each other, and each toward a common center, they will intercept each other, causing the gases to be thoroughly mixed. The mixture will then be conducted into the chamber of the extension $b$ to the nozzle $c$.

By providing an elongated chamber through which the mixture must pass as it is delivered to the nozzle tip, the parts adjacent the flame are cooled to a sufficient extent by the gas, as it passes therethrough to prevent them from being heated to such a temperature as to cause injury thereto, or make it necessary to cool them at intervals while in use.

I claim:—

1. A gas-mixing burner having two inner chambers arranged at different longitudinal points and an outer chamber surrounding said inner chambers, extending therebetween and having a gas inlet leading thereto, one of said inner chambers having a gas inlet and a series of oppositely extending outlets leading to said outer chamber and the other of said inner chambers having a series of oppositely disposed inlets leading thereto from said outer chamber, and a burner tip connected to said last named inner chamber, substantially as described.

2. A gas-mixing burner, comprising an outer casing, an inner casing centrally disposed within said outer casing, extending longitudinally thereof and providing an annular receiving chamber, said outer casing having a gas inlet therethrough to said chamber, and said inner casing having an inlet chamber, an inlet leading thereto, a series of outlet passages in its walls leading into said receiving chamber, a centrally disposed discharge chamber, separated from said inlet chamber, and a series of passages in the walls of said discharge chamber leading from said receiving chamber and oppositely arranged to cause the jets of gas passing into said discharge chamber to intercept each other, and a burner tip connected to said discharge chamber, substantially as described.

3. A gas-mixing burner, comprising two cylindrical casings arranged one within the other and providing an annular intermediate receiving chamber, said inner casing having an inlet and a discharge chamber oppositely disposed at the ends thereof, means for conducting gas from independent sources to said receiving chamber and said inlet chamber, respectively, the wall of said inlet chamber having a series of passages therethrough leading into said receiving chamber, to cause a partial mixing of the gases, and the wall of said discharge chamber having a series of radially disposed passages therethrough, leading into said receiving chamber, and arranged to cause jets of the partially mixed gas, passing therefrom, to intercept each other within said discharge chamber, and a burner tip connected to said discharge chamber, substantially as described.

In testimony whereof, I have signed my name to this specification, in the presence of two subscribing witnesses.

EDWARD H. WIGHT.

Witnesses:
L. H. HARRIMAN,
H. B. DAVIS.